(12) United States Patent
Matsui

(10) Patent No.: US 10,091,379 B2
(45) Date of Patent: Oct. 2, 2018

(54) INFORMATION PROCESSING DEVICE AND STORAGE MEDIUM

(71) Applicant: FUJI XEROX CO., LTD., Tokyo (JP)

(72) Inventor: Haruki Matsui, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/474,391

(22) Filed: Mar. 30, 2017

(65) Prior Publication Data

US 2018/0097957 A1    Apr. 5, 2018

(30) Foreign Application Priority Data

Oct. 5, 2016    (JP) .................................. 2016-196880

(51) Int. Cl.
*H04N 1/00*    (2006.01)

(52) U.S. Cl.
CPC ..... *H04N 1/00938* (2013.01); *H04N 1/00244* (2013.01); *H04N 1/00344* (2013.01); *H04N 1/00474* (2013.01); *H04N 2201/0094* (2013.01)

(58) Field of Classification Search
USPC ........................................................ 358/1.13
See application file for complete search history.

(56) References Cited

U.S. PATENT DOCUMENTS

| 2009/0031432 A1* | 1/2009 | Wakai ..................... G06F 21/10 726/33 |
| 2011/0276501 A1* | 11/2011 | Sako ....................... G06F 21/10 705/310 |

FOREIGN PATENT DOCUMENTS

| JP | 5454208 B2 | 3/2014 |
| JP | 5778829 B2 | 9/2015 |

* cited by examiner

*Primary Examiner* — Ngon Nguyen
(74) *Attorney, Agent, or Firm* — Oliff PLC

(57) ABSTRACT

An information processing device includes a product information acquisition unit that acquires information indicative of a correlation between a product and one or plural product composition elements composing the product, for each product being software; a product composition element acquisition unit that acquires information indicative of one or plural product composition elements installed in a device, from the device; a specification unit that specifies a product installed in the device on the basis of the information indicative of the one or plural product composition elements acquired by the product composition element acquisition unit and the correlation; and a controller that causes a display to display the product specified by the specification unit.

8 Claims, 17 Drawing Sheets

FIG. 5

| | | PRODUCT A | PRODUCT A | PRODUCT B | PRODUCT C | PRODUCT D | PRODUCT E | PRODUCT F | PRODUCT G | PRODUCT H |
|---|---|---|---|---|---|---|---|---|---|---|
| PRODUCT INFORMATION | PRODUCT ID | | | | | | | | | |
| | PRODUCT VERSION | 1.0 | 1.1 | 1.0 | 1.0 | 1.0 | 1.0 | 1.1 | 1.0 | 1.0 |
| | PRODUCT NAME | Smart Copy | Smart Copy | Smart Scan | Smart Fax | Smart Solutions | Doc Connector | PC Connector | Cloud Fiend | Cloud Support |
| | RELEASE DATE | 10/1/2016 | 12/1/2016 | 10/1/2016 | 10/1/2016 | 10/1/2016 | 10/1/2016 | 12/1/2016 | 10/1/2016 | 10/1/2016 |
| | TARGET MODEL | 1.1.21.1<br>1.1.21.2<br>1.1.21.3 | 1.1.21.1<br>1.1.21.2<br>1.1.21.3<br>1.1.21.4 | 1.1.21.1<br>1.1.21.2<br>1.1.21.3 | 1.1.21.1<br>1.1.21.2<br>1.1.21.3 | 1.1.21.1<br>1.1.21.2<br>1.1.21.3 | 1.1.21.1<br>1.1.21.2<br>1.1.21.3 | 1.1.21.1<br>1.1.21.2<br>1.1.21.3 | 1.1.21.1<br>1.1.21.2<br>1.1.21.3 | 1.1.21.1<br>1.1.21.2<br>1.1.21.3 |
| MODULE INFORMATION | MODULE ID/ VERSION/ TARGET MODEL (●IS COMMON COMPONENT) | • ModuleA/<br>1.0/<br>1.1.21.1,<br>.1.21.2<br>OR<br>• ModuleAA<br>/1.0/<br>1.1.21.3 | • ModuleA/<br>1.1/* | • ModuleB1<br>/1.0/*<br>OR<br>• ModuleB2<br>/1.0/* | • ModuleC/<br>1.0/* | BOTH<br>ModuleC/<br>1.0/*<br>AND<br>ModuleD/<br>1.0/* | BOTH<br>ModuleE/<br>1.0/*<br>AND<br>●ModuleX/<br>1.1/* | BOTH<br>ModuleF/<br>1.1/*<br>AND<br>●ModuleX/<br>1.1/* | ModuleY/<br>1.0/* | ModuleY/<br>1.0/* |

FIG. 10

| | PROBLEM IN PRODUCT SPECIFICATION | CONTROL FOR PRODUCT SPECIFICATION | CONTROL ON DISPLAY |
|---|---|---|---|
| CASE WHERE MODULES ARE INDEPENDENT | • NO PROBLEM BECAUSE OF UNIQUE SPECIFICATION | • NOTHING IN PARTICULAR | • SPECIFIED PRODUCT IS DISPLAYED |
| α. INCLUSION CASE | • WHEN INCLUDING PRODUCT (LARGE PRODUCT) IS REGISTERED, INCLUDED PRODUCT (SMALL PRODUCT) MAY NOT BE DESIRED TO BE DISPLAYED<br>(BECAUSE LARGE PRODUCT IS NOT ABLE TO BE SPECIFIED WHEN SMALL PRODUCT IS UPDATED/DELETED) | • NOTHING IN PARTICULAR | • "SMALL PRODUCT" IS NOT DISPLAYED EVEN SPECIFIED (OR "SMALL PRODUCT" IS DISPLAYED AND OPERATION IS INHIBITED) |
| β. COMMON COMPONENT USE CASE | • VERSION OF COMMON COMPONENT MAY BE CHANGED BY INSTALLATION OF ANOTHER PRODUCT<br>→ INFLUENCE ON PRODUCT SPECIFICATION | • VERSION OF COMMON COMPONENT IS NOT USED FOR PRODUCT SPECIFICATION<br>(COMMON COMPONENT MAY NOT BE USED FOR PRODUCT SPECIFICATION) | • SPECIFIED PRODUCT IS DISPLAYED |
| γ. EXACT MATCH CASE | • NO PARTICULAR PROBLEM ALTHOUGH PLURAL PRODUCTS MAY BE SPECIFIED FOR MODULE | • NOTHING IN PARTICULAR | • DISPLAY IS PROVIDED TO INDICATE BEING IN PRODUCT GROUP USING SAME MODULE |

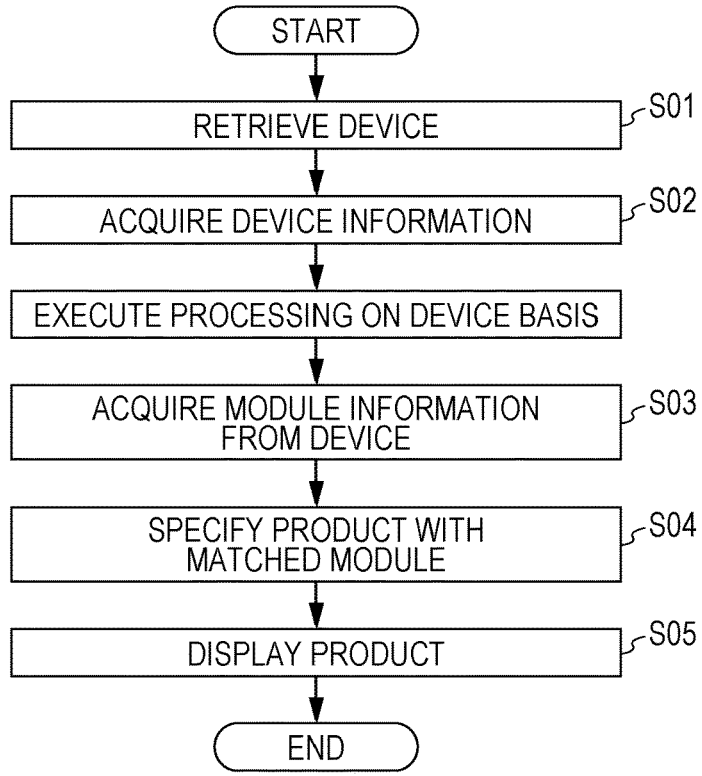
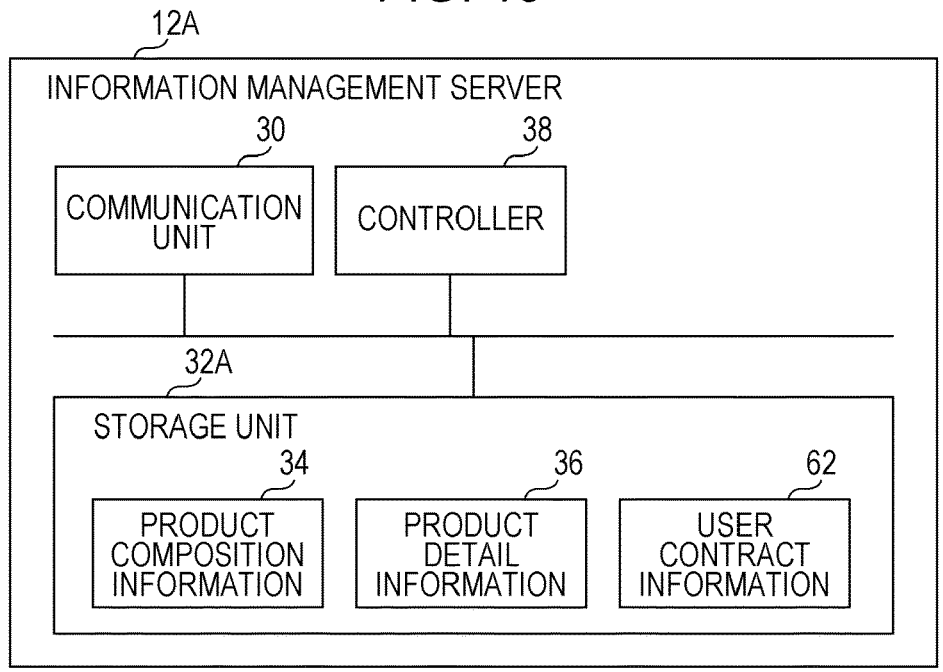

FIG. 17

| | | PRODUCT ID | PRODUCT A | PRODUCT A | PRODUCT B | PRODUCT C | PRODUCT D | PRODUCT E | PRODUCT F | PRODUCT G | PRODUCT H |
|---|---|---|---|---|---|---|---|---|---|---|---|
| PRODUCT INFORMATION | | PRODUCT VERSION | 1.0 | 1.1 | 1.0 | 1.0 | 1.0 | 1.0 | 1.0 | 1.0 | 1.0 |
| | | PRODUCT NAME | Smart Copy | Smart Copy | Smart Scan | Smart Fax | Smart Solutions | Doc Connector | PC Connector | Cloud Fiend | Cloud Support |
| | | RELEASE DATE | 10/1/2016 | 12/1/2016 | 10/1/2016 | 10/1/2016 | 10/1/2016 | 10/1/2016 | 10/1/2016 | 10/1/2016 | 10/1/2016 |
| | | TARGET MODEL | 1.1.21.1<br>1.1.21.2<br>1.1.21.3 | 1.1.21.1<br>1.1.21.2<br>1.1.21.3<br>1.1.21.4 | 1.1.21.1<br>1.1.21.2<br>1.1.21.3 | 1.1.21.1<br>1.1.21.2<br>1.1.21.3 | 1.1.21.1<br>1.1.21.2<br>1.1.21.3 | 1.1.21.1<br>1.1.21.2<br>1.1.21.3 | 1.1.21.1<br>1.1.21.2<br>1.1.21.3 | 1.1.21.1<br>1.1.21.2<br>1.1.21.3 | 1.1.21.1<br>1.1.21.2<br>1.1.21.3 |
| MODULE INFORMATION | | MODULE ID/ VERSION/ (●IS COMMON COMPONENT) | • ModuleA/<br>1.0 | • ModuleA/<br>1.1 | • ModuleB1<br>/1.0 | • ModuleC/<br>1.0 | BOTH<br>ModuleC/<br>1.0<br>AND<br>ModuleD/<br>1.0 | BOTH<br>ModuleE/<br>1.0<br>AND<br>●ModuleX/<br>1.0 | BOTH<br>ModuleF/<br>1.1<br>AND<br>●ModuleX/<br>1.0 | ModuleY/<br>1.0 | ModuleY/<br>1.0 |

FIG. 18

| CASE CAUSING ERROR | SPECIFIC PROBLEM IN PRODUCT MANAGEMENT | CONTROL FOR INSTALLATION | CONTROL FOR UPDATE | CONTROL FOR UNINSTALLATION |
|---|---|---|---|---|
| α. INCLUSION CASE | • THERE MAY BE CONFUSION BECAUSE REGISTRATION OF INCLUDED PRODUCT (SMALL PRODUCT) IS MEANINGLESS WHEN INCLUDING PRODUCT (LARGE PRODUCT) IS REGISTERED<br><br>• COMPOSITION OF LARGE PRODUCT IS BROKEN (MAY NOT BE USED) IF SMALL PRODUCT IS DELETED | • REGISTRATION OF SMALL PRODUCT IN DEVICE WITH LARGE PRODUCT REGISTERED IS INHIBITED | • UPDATE OF SMALL PRODUCT IN DEVICE WITH LARGE PRODUCT REGISTERED IS INHIBITED<br><br>• SMALL PRODUCT IS NOT DISPLAYED ON DEVICE WITH LARGE PRODUCT REGISTERED | • SMALL PRODUCT IS NOT DISPLAYED ON DEVICE WITH LARGE PRODUCT REGISTERED |
| β. COMMON COMPONENT USE CASE | • ONE PRODUCT MAY NOT BE USED IF DELETION OF ONE PRODUCT IS UPDATED | • NOTHING IN PARTICULAR | • NOTHING IN PARTICULAR | • COMMON COMPONENT IS NOT DELETED AT DELETION |
| γ. EXACT MATCH CASE | • USER MAY FEEL UNCOMFORTABLE WITHOUT ANY MEASURE BECAUSE PLURAL PRODUCTS ARE REGISTERED WHEN ONE PRODUCT IS REGISTERED | • DISPLAY IS PROVIDED TO INDICATE THAT PLURAL PRODUCTS ARE SIMULTANEOUSLY REGISTERED | • DISPLAY IS PROVIDED TO INDICATE THAT PLURAL PRODUCTS ARE SIMULTANEOUSLY UPDATED | • DISPLAY IS PROVIDED TO INDICATE THAT PLURAL PRODUCTS ARE SIMULTANEOUSLY DELETED |

FIG. 20

| | (1) CONTROL AT DISPLAY | (2) CONTROL IN PERIOD FROM OPERATION SELECTION TO OPERATION EXECUTION | (3) CONTROL AT OPERATION EXECUTION |
|---|---|---|---|
| INSTALLATION | N/A | α: REGISTRATION OF SMALL PRODUCT IN DEVICE WITH LARGE PRODUCT REGISTERED IS INHIBITED | γ: DISPLAY IS PROVIDED TO INDICATE THAT PLURAL PRODUCTS ARE SIMULTANEOUSLY REGISTERED |
| UPDATE | α: SMALL PRODUCT IS NOT DISPLAYED ON DEVICE WITH LARGE PRODUCT REGISTERED, OR OPERATION ON SMALL PRODUCT IS INVALIDATED | α: UPDATE OF SMALL PRODUCT IN DEVICE WITH LARGE PRODUCT REGISTERED IS INHIBITED | γ: DISPLAY IS PROVIDED TO INDICATE THAT PLURAL PRODUCTS ARE SIMULTANEOUSLY UPDATED |
| UNINSTALLATION | α: SMALL PRODUCT IS NOT DISPLAYED ON DEVICE WITH LARGE PRODUCT REGISTERED, OR OPERATION ON SMALL PRODUCT IS INVALIDATED | N/A | β: COMMON COMPONENT IS NOT DELETED AT DELETION<br>γ: DISPLAY IS PROVIDED TO INDICATE THAT PLURAL PRODUCTS ARE SIMULTANEOUSLY DELETED |

INFORMATION PROCESSING DEVICE AND STORAGE MEDIUM

CROSS-REFERENCE TO RELATED APPLICATIONS

This application is based on and claims priority under 35 USC 119 from Japanese Patent Application No. 2016-196880 filed Oct. 5, 2016.

BACKGROUND (i) Technical Field

The present invention relates to an information processing device and a storage medium.

(ii) Related Art

Software installed in a device may be checked by, for example, a user.

SUMMARY

According to an aspect of the invention, there is provided an information processing device including a product information acquisition unit that acquires information indicative of a correlation between a product and one or plural product composition elements composing the product, for each product being software; a product composition element acquisition unit that acquires information indicative of one or plural product composition elements installed in a device, from the device; a specification unit that specifies a product installed in the device on the basis of the information indicative of the one or plural product composition elements acquired by the product composition element acquisition unit and the correlation; and a controller that causes a display to display the product specified by the specification unit.

BRIEF DESCRIPTION OF THE DRAWINGS

An exemplary embodiment of the present invention will be described in detail based on the following figures, wherein:

FIG. 5 is an illustration showing an example of a product composition table;

FIG. 10 is an illustration showing a table of controls according to dependencies of modules;

FIG. 12 is a flowchart showing processing according to the first exemplary embodiment;

FIG. 13 is a block diagram showing an information management server according to a modification of the first exemplary embodiment;

FIG. 17 is an illustration showing an example of a product composition table;

FIG. 18 is an illustration showing a table of controls according to dependencies of modules;

FIG. 20 is an illustration showing a table of controls at respective timings;

DETAILED DESCRIPTION

First Exemplary Embodiment

Figure 1:
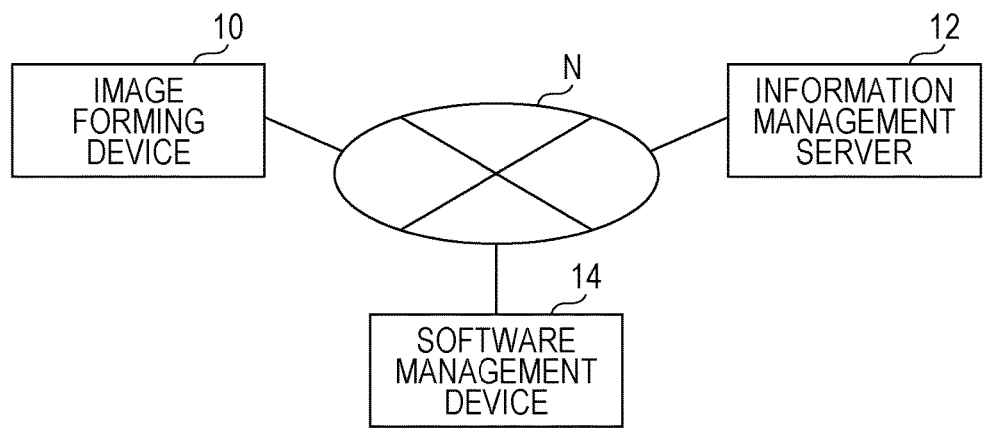
FIG. 1 is a block diagram showing a software management system according to a first exemplary embodiment of the invention.

A software management system as an information processing system according to a first exemplary embodiment of the invention is described with reference to FIG. 1. FIG. 1 shows an example of the software management system according to the first exemplary embodiment. This software management system includes an image forming device 10 being an example of a device, an information management server 12, and a software management device 14 being an example of an information processing device. The image forming device 10, the information management server 12, and the software management device 14 have functions of communicating with one another through a communication path N. In the example shown in FIG. 1, a single image forming device 10 is included in the software management system; however, plural image forming devices 10 may be included in the software management system. Of course, another device may be included in the software management system.

The image forming device 10 has an image forming function. The image forming device 10 has, for example, at least one of a scan function, a print function, a copy function, and a facsimile function. Also, the image forming device 10 has a function of transmitting and receiving data to and from another device.

The information management server 12 manages information relating to a product being software. The product is software (program) that may be installed (registered) into the image forming device 10 being a device. The product may be with charge or without charge. The product is composed of one or plural product composition elements (modules). The module (product composition element) is software (program). For example, there may be a package in which a product includes another product (inclusion case α) in accordance with, for example, a product strategy. That is, a product may include all modules composing another product. For another example, plural different products may share the same module (common component use case β). For still another example, the same module may form plural different products (exact match case γ). Also, the information management server 12 has a function of transmitting and receiving data to and from another device.

The software management device 14 acquires information indicative of a module installed in the image forming device 10 being an example of a device from the image forming device 10, and specifies a product installed in the image forming device 10 on the basis of the information indicative of the module. Also, the software management device 14 has a function of transmitting and receiving data to and from another device. The image forming device 10 is merely an example of a device. The software management device 14 may specify a product installed in a device other than the image forming device 10.

A communication path N is provided by a network, such as the Internet or a local area network (LAN).

Figure 2:
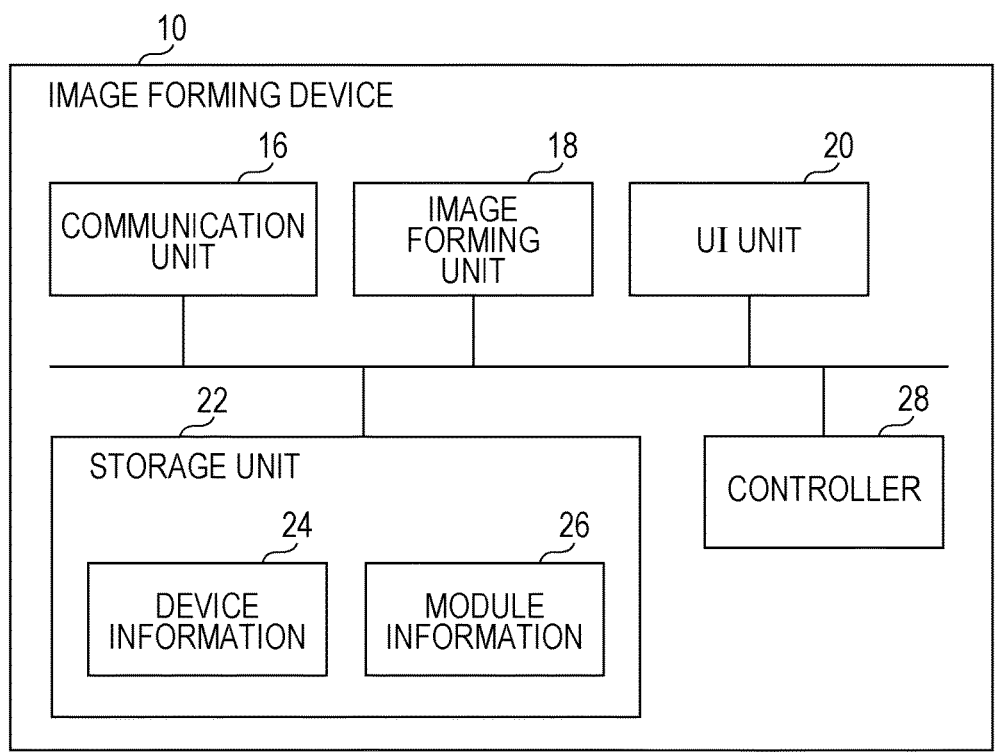
FIG. 2 is a block diagram showing an image forming device according to the first exemplary embodiment.

A configuration of the image forming device 10 is described below in detail with reference to FIG. 2. FIG. 2 shows the configuration of the image forming device 10.

A communication unit 16 is a communication interface, and has a function of transmitting data to another device, and a function of receiving data from another device. The communication unit 16 has a wireless communication function such as Wi-Fi (registered trademark) communication or a wired communication function, and a function of transmitting and receiving data through the network, such as the Internet or the LAN.

An image forming unit 18 executes image forming processing. The image forming unit 18 executes, for example, at least one of the scan function, the print function, the copy function, and the facsimile function. When the scan function is executed, a document is read and scan data (image data) is generated. When the print function is executed, an image is printed on a recording medium such as paper. When the copy function is executed, a document is read and printed on a recording medium. When the facsimile function is executed, image data is transmitted or received by facsimile. Also, a composite function in which plural functions are combined may be executed. For example, a scan transfer function in which the scan function is combined with a transmission function (transfer function) may be executed. When the scan transfer function is executed, a document is read, scan data (image data) is generated, and the scan data is transmitted to a transmission destination (for example, an external device, such as a terminal device or server). Of course, the combination function is merely an example, and another combination function may be executed.

A UI unit 20 is a user interface unit, and includes a display and an operation unit. The display is a display device, for example, a liquid crystal display. The operation unit is an input device, for example, a touch panel or a keyboard. Of course, the UI unit 20 may be a user interface having both the functions of the display and the operation unit (for example, a display as a touch panel, or a display that electronically displays a keyboard or the like).

A storage unit 22 is a storage device, such as a hard disk or a memory. For example, the storage unit 22 stores execution instruction information indicative of an execution instruction for the image forming processing (for example, job information), image data to be printed, scan data generated by executing the scan function, various control data, various programs, various data, and other data. Of course, these pieces of data may be stored in different storage devices or may be stored in the same storage device. Also, the storage unit 22 stores device information 24 and module information 26.

The device information 24 is information for identifying the image forming device 10. For example, the device information 24 is information including information indicative of the model of the image forming device 10 (for example, model ID (device ID) or model name).

The module information 26 is information for identifying a module (product composition element) installed (registered) in the image forming device 10. For example, the module information 26 is information including information indicative of the module ID and the version of the module.

A controller 28 controls operations of respective units of the image forming device 10.

Figure 3:
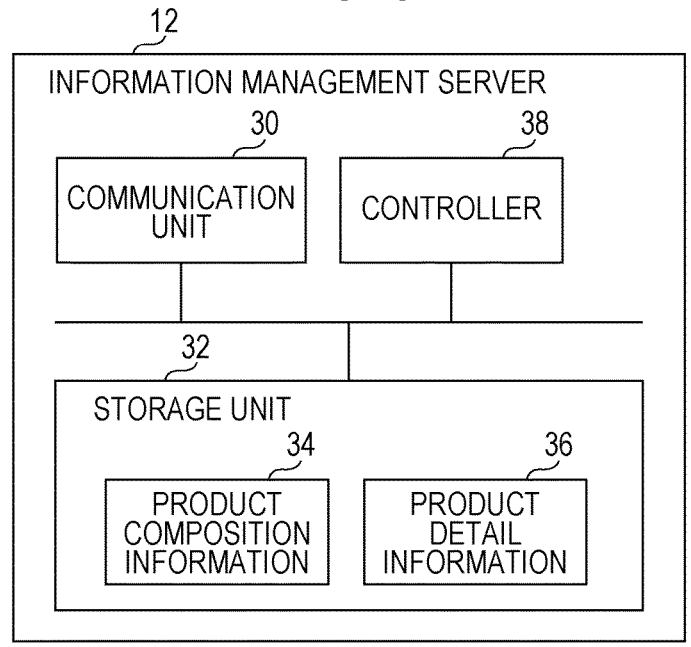
FIG. 3 is a block diagram showing an information management server according to the first exemplary embodiment.

A configuration of the information management server 12 is described below in detail with reference to FIG. 3. FIG. 3 shows the configuration of the information management server 12.

A communication unit 30 is a communication interface, and has a function of transmitting data to another device, and a function of receiving data from another device. The communication unit 30 has a wireless communication function such as Wi-Fi (registered trademark) communication or a wired communication function, and a function of transmitting and receiving data through the network, such as the Internet or the LAN.

A storage unit 32 is a storage device, such as a hard disk or a memory. For example, the storage unit 32 stores various control data and various data. Of course, these pieces of data may be stored in different storage devices or may be stored in the same storage device. Also, the storage unit 32 stores product composition information 34 and product detail information 36.

The product composition information 34 is information indicative of a correlation between a product and one or plural modules composing the product, for each product being software. The product composition information 34 is generated in advance and stored in the storage unit 32. By referencing the product composition information 34, a module composing a product is specified and a product composed of a module is specified.

The product detail information 36 is detailed information relating to a product being software (for example, description on a product or a product name).

A controller 38 controls operations of respective units of the information management server 12.

Figure 4:
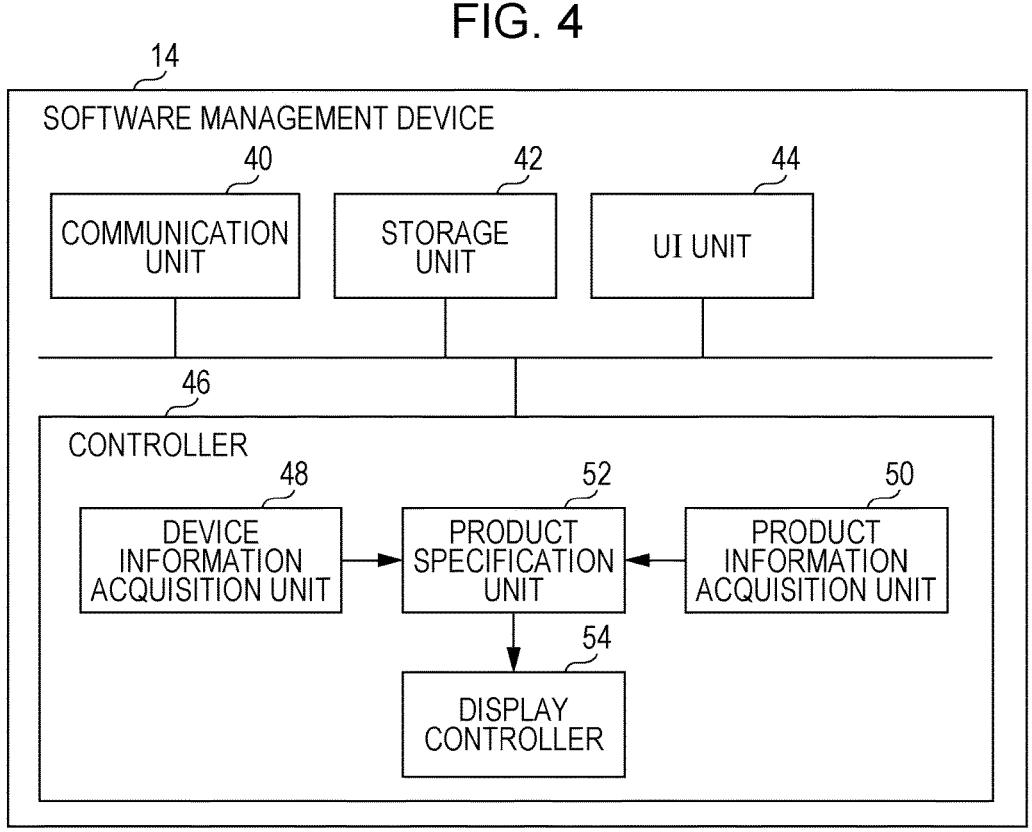
FIG. 4 is a block diagram showing a software management device according to the first exemplary embodiment.

A configuration of the software management device 14 is described below in detail with reference to FIG. 4. FIG. 4 shows the configuration of the software management device 14.

A communication unit 40 is a communication interface (e.g., a network interface), and has a function of transmitting data to another device, and a function of receiving data from another device. The communication unit 40 has a wireless communication function such as Wi-Fi (registered trademark) communication or a wired communication function, and a function of transmitting and receiving data through the network, such as the Internet or the LAN.

A storage unit 42 is a storage device, such as a hard disk or a memory. For example, the storage unit 42 stores various control data and various data. Of course, these pieces of data may be stored in different storage devices or may be stored in the same storage device.

A UI unit 44 is a user interface unit, and includes a display and an operation unit. The display is a display device, for example, a liquid crystal display. The operation unit is an input device, for example, a touch panel or a keyboard. Of course, the UI unit 44 may be a user interface having both the functions of the display and the operation unit (for example, a display as a touch panel, or a display that electronically displays a keyboard or the like).

A controller 46 (e.g., a processor) controls operations of respective units of the software management device 14. Also, the controller 46 includes a device information acquisition unit 48, a product information acquisition unit 50, a product specification unit 52, and a display controller 54.

The device information acquisition unit 48 has a function of retrieving each image forming device 10 included in the software management system and acquiring the device information 24 and the module information 26 from the image forming device 10. It is to be noted that the device information 24 and the module information 26 acquired by the device information acquisition unit 48 may be stored in the storage unit 42. The device information acquisition unit 48 corresponds to an example of a product composition element acquisition unit.

The product information acquisition unit 50 has a function of acquiring the product composition information 34 and the product detail information 36 from the information management server 12. It is to be noted that the product composition information 34 and the product detail information 36 acquired by the product information acquisition unit 50 may be stored in the storage unit 42.

The product specification unit 52 has a function of specifying a product installed (registered) in the image forming device 10 on the basis of the module information 26 acquired from the image forming device 10 and the product composition information 34 acquired from the information management server 12, for each image forming device 10 included in the software management system. To be specific, the product specification unit 52 specifies a product corresponding to a module indicated by the module information 26 acquired from the image forming device 10 in the product composition information 34, as a product installed in the image forming device 10.

Also, the product composition information 34 may be information indicative of correspondence of a product, one or plural modules composing the product, and the model of an image forming device 10 corresponding to the product (the model of an image forming device 10 into which the product may be installed), for each product being software. In this case, the product specification unit 52 may specify a product installed in an image forming device 10, on the basis of the device information 24 and the module information 26 acquired from the image forming device 10, and the product composition information 34, for each image forming device 10. To be specific, the product specification unit 52 specifies a product corresponding to a model indicated by the device information 24 and a module indicated by the module information 26 acquired from the image forming device 10 in the product composition information 34, as a product installed in the image forming device 10.

Also, in a case where plural modules are installed in an image forming device 10, that is, in a case where the module information 26 acquired from the image forming device 10 indicates plural modules, the product specification unit 52 controls specification of a product in accordance with a dependency of the plural modules. The specification control based on the dependency is described later in detail.

The display controller 54 controls display of a product specified by the product specification unit 52. The display controller 54 causes the UI unit 44 to display the product specified by the product specification unit 52. Of course, the display controller 54 may cause a display device to display a product on a device other than the software management device 14. For example, information indicative of a product specified by the product specification unit 52 may be transmitted to a terminal device (for example, a personal computer (PC), a tablet PC, a smart phone, or a mobile phone), and the display controller 54 may cause a display device of the terminal device to display the product. Of course, the software management device 14 may be configured of a terminal device.

Also, if plural products are specified for the same image forming device 10 by the product specification unit 52, the display controller 54 controls display of the plural products on the basis of the dependency of modules between the plural products. The display control based on the dependency is described later in detail.

The software management system according to the first exemplary embodiment is described below with a specific example.

The product composition information 34 according to the first exemplary embodiment is described in detail with reference to FIG. 5. FIG. 5 shows a product composition table being an example of the product composition information 34.

In the product composition table, product identification information for identifying a product being software (for example, product ID), product attribute information indicative of the version of the product, information indicative of the name of the product, information indicative of the release date of the product, information indicative of the model of an image forming device 10 corresponding to the product (the model of an image forming device 10 into which the product may be installed), and information indicative of one or plural modules composing the product are associated with one another. The information indicative of the module includes, for example, a module ID, module attribute information indicative of the version of the module, and information indicative of the model of an image forming device 10 corresponding to the module (the model of an image forming device 10 into which the module may be installed).

For example, a product A (version 1.0) is a product composed of a module A (version 1.0) or a module AA (version 1.0). A product A (version 1.1) is the same product as the product A (version 1.0); however, the product A (version 1.1) is a product composed of a module A (version 1.1) different from the module of the product A (version 1.0). Also, a product D is a product composed of plural modules (module C (version 1.0) and module D (version 1.0)).

Also, a module X (version 1.1) is a common module shared by plural products, that is, a common module included in plural products. By referencing the product composition table, a common module is specified.

The product specification unit 52 specifies a product installed in an image forming device 10 by referencing the product composition table. With reference to the product composition table, the product specification unit 52 specifies a product corresponding to a module ID and a version indicated by the module information 26 acquired from an image forming device 10 (for example, product ID and version), as a product installed in the image forming device 10. Also, the product specification unit 52 may specify a product corresponding to a model ID indicated by the device information 24, and a module ID and a version indicated by the module information 26 acquired from an image forming device 10 in the product composition table, as a product installed in the image forming device 10.

A dependency of modules between plural products is described below in detail. For example, an independent case, an inclusion case α, a common component use case β, and an exact match case γ may be generated as dependencies.

A product relation corresponding to the independent case is described with reference to FIG. 6. For example, a product A (version 1.0) is composed of a module A (version 1.0), and a product B (version 1.0) is composed of a module B (version 1.0). That is, in the products A and B, the modules A and B are independent from one another.

A product relation corresponding to the inclusion case α is described with reference to FIG. 7. For example, a product C is composed of a module C, and a product D is composed of the module C and a module D. That is, the product D is a product including all modules (module C) composing the product C. In this case, the products C and D are products mutually having a dependency (inclusion relation). For example, there may be a case where plural products are provided as a package. The product D corresponds to the package. The product C corresponds to a product composing the package.

A product relation corresponding to the common component use case β is described with reference to FIG. 8. For example, a product E (version 1.0) is composed of a module E (version 1.0) and a module X (version 1.1). A product F (version 1.1) is composed of a module F (version 1.1) and the module X (version 1.1). That is, the module X (version 1.1) is a common module shared by the products E and F.

A product relation corresponding to the exact match case γ is described with reference to FIG. 9. For example, a product G (version 1.0) is composed of a module Y (version 1.0), and a product H (version 1.0) is also composed of the module Y (version 1.0). That is, the products G and H are composed of the same module Y (version 1.0). There may be a case where mutually different plural products are created although the products each are composed of the same module. For example, in a case where there is a module for connection with a cloud service, if a service of a connection destination includes plural services and the services are different from one another, products may be created respectively for the services of connection destinations and may be handled as mutually different products although the modules are the same. The products G and H are composed of the same module; however, for example, the services to which the module is applied are different from one another.

In the first exemplary embodiment, for example, the product specification control by the product specification unit 52 and the product display control by the display controller 54 are changed in accordance with the dependency of modules between plural products. The controls are described below in detail with reference to FIG. 10. FIG. 10 shows a table of controls according to dependencies of modules. In this table, a problem in product specification, control for product specification, and control on display are associated with one another for each case.

The independent case is described below. In a case where the dependency of modules is the independent case, that is, in a case where plural products are specified for the same image forming device 10 and respective modules are independent between plural products as shown in FIG. 6, the respective products corresponding to the respective modules are uniquely specified and hence it is expected that a problem does not occur in product specification. Therefore, the product specification unit 52 specifies a product installed in an image forming device 10, on the basis of the module information 26 (and the device information 24) acquired from the image forming device 10, and the product composition information 34 acquired from the information management server 12. The display controller 54 causes the UI unit 44 to display the specified product.

The inclusion case α is described below. In a case where the dependency of modules is the inclusion case α, that is, in a case where plural products are specified for the same image forming device 10 and a product D (referred to as "large product") includes another product C (referred to as "small product") as shown in FIG. 7, a trouble may occur when the specified small product is displayed on the UI unit 44. For example, an operation, such as installation (registration), update, or uninstallation (deletion) of a product, may be executed by a user, in a screen in which product are displayed. In this case, when the small product is displayed on the UI unit 44, update or uninstallation of the small product may be instructed by a user. If the small product is updated or uninstalled, a module composing the small product is updated or uninstalled by the update or uninstallation of the small product. Accordingly, the composition of the large product including the module may be influenced or it may be difficult to specify the large product. For example, when the small product is uninstalled, the module composing the small product is also deleted from the large product. Hence, a problem may occur in use of the large product in a situation unexpected by the user. To address this, the display controller 54 causes the UI unit 44 to display the specified large product; however, inhibits the UI unit 44 from displaying the specified small product. Describing with reference to the example shown in FIG. 7, the display controller 54 causes the UI unit 44 to display the product D; however, inhibits the UI unit 44 from displaying the product C. Accordingly, the product C is not operated by the user and the influence on the product D by the operation is prevented. It is to be noted that the large product corresponds to an example of a first product and the small product corresponds to an example of a second product.

For another example, the display controller 54 may cause the UI unit 44 to display the specified large product (for example, product D), and may cause the UI unit 44 to display the small product (for example, product C) in a state in which an operation by the user on the specified small product is invalid. The state in which an operation is invalid is, for example, a state in which an operation by the user on the small product is not accepted or a state in which the operation is inhibited. For example, even if the small product is operated by the user, the controller 46 does not accept the operation and invalidates the operation. Accordingly, even if an instruction for update or uninstallation is given to the small product by the user, the update or uninstallation is not executed, and the influence on the large product is prevented.

The common component use case β is described below. In a case where the dependency of modules is the common component use case β, that is, in a case where plural products are specified for the same image forming device 10, and a product E and another product F share the same module as shown in FIG. 8, the version of the common module may be changed by installation of another product. When a product is specified by also using the version of a module, if the version of the common module is changed, the product is not specified. To address this, without use of the version (information being an example of attribute information of a module) of a common module (for example, module X), the product specification unit 52 specifies a product installed in an image forming device 10 on the basis of the ID (and the device information 24) of the common module. For another example, the product specification unit 52 may specify a product installed in an image forming device 10 on the basis of another module without use of a common module.

The exact match case γ is described below. In a case where the dependency of modules is the exact match case γ, that is, in a case where plural products (for example, products G and H) are composed of the same module (for example, module Y) as shown in FIG. 9, if the module is installed in an image forming device 10, the plural products (for example, products G and H) are specified as products installed in the image forming device 10. In this case, occurrence of a problem in product specification is not expected. The display controller 54 causes the UI unit 44 to display plural products (for example, products G and H) composed of the same module as a product group belonging to the same group. Accordingly, even if the plural products composed of the same module are displayed on the UI unit 44, it is indicated that the products are not composed of different modules but are composed of the same module, to the user.

Figure 11:
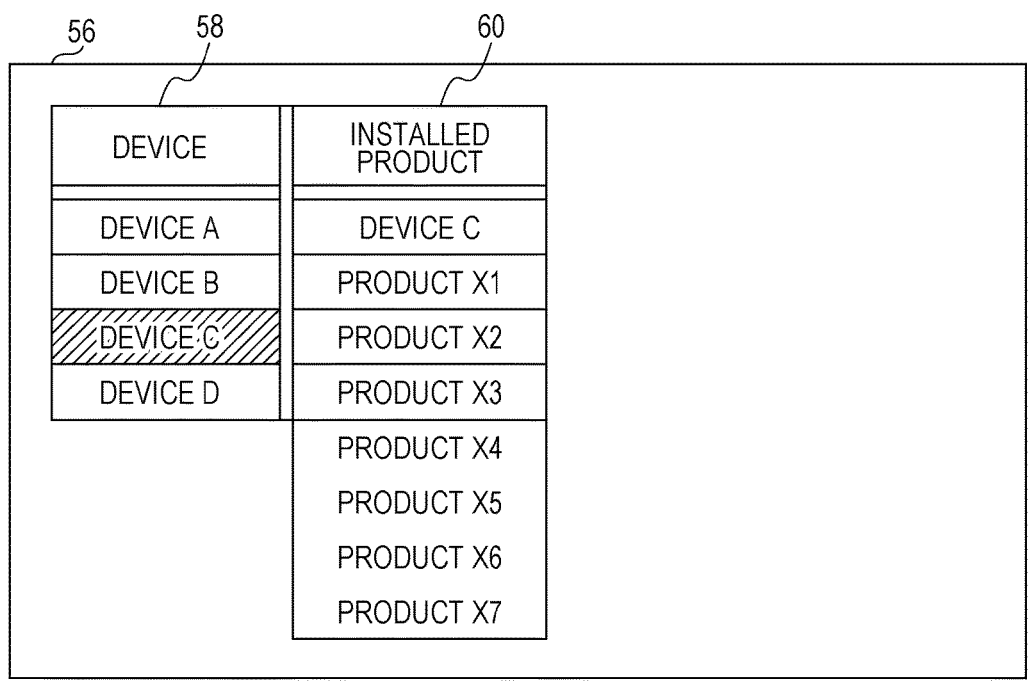
FIG. 11 is an illustration showing an example of a product display screen.

A product display screen is described below with reference to FIG. 11. FIG. 11 shows an example of the screen. For example, if the user inputs user identification information, such as a user ID and a password, by using the UI unit 44 and thereby logs into the software management system, the display controller 54 causes the UI unit 44 to display a product display screen 56. In the product display screen 56, a list of device information (for example, device IDs) for identifying image forming devices 10 being devices included in the software management system is displayed as indicated by reference sign 58. For example, the device information acquisition unit 48 retrieves image forming devices 10 included in the software management system and acquires the device information 24 from each retrieved image forming device 10. The display controller 54 causes the list of device IDs included in the device information to be displayed in the product display screen 56. In the example shown in FIG. 11, devices A, B, C, and D are displayed. When the user designates a specific image forming device 10 from the device list by using the UI unit 44, the display controller 54 causes a list of products installed in the image forming device 10 designated by the user, that is, a list of products specified by the product specification unit 52 to be displayed in the product display screen 56, as indicated by reference sign 60. In the example shown in FIG. 11, the device C is designated by the user, and a list of products installed in the device C (for example, products X1 to X7) is displayed in the product display screen 56.

For example, if the dependency of the inclusion case α is established between plural products installed in the device C, the display controller 54 inhibits a small product from being displayed in the product display screen 56. For example, it is assumed that the product X1 corresponds to a large product, a product X10 corresponds to a small product, and the product X1 and the product X10 are specified as products installed in the device C by the product specification unit 52. In this case, the products X1 and X10 have the dependency of the inclusion case α, and hence the display controller 54 inhibits the product X10 from being displayed in the product display screen 56. Accordingly, the product X10 is prevented from being updated or uninstalled by a user, and as the result, the influence on the product X1 is prevented. For another example, the display controller 54 may cause the product X10 to be displayed in the product display screen 56 in a state in which an operation by a user on the product X10 is invalid.

In the example shown in FIG. 11, the products X4 to X7 are products composed of the same module, and hence are displayed as a group. Accordingly, it is indicated that the products X4 to X7 are composed of the same module to the user.

Processing by the software management device 14 is described below with reference to FIG. 12. FIG. 12 shows a flowchart showing the processing.

First, a user inputs, for example, a user ID and a password by using the UI unit 44, and thereby logs into the software management system. When the login is completed, the device information acquisition unit 48 retrieves image forming devices 10 being devices included in the software management system (S01), and acquires the device information 24 from each retrieved image forming device 10 (S02). It is to be noted that the device information acquisition unit 48 may acquire the device information from each image forming device 10 periodically or at a certain timing, or may acquire the device information in response to an instruction from the user. Processing is executed as described below on an individual image forming device 10 basis.

First, the device information acquisition unit 48 acquires the module information 26 from the image forming device 10 (S03). It is to be noted that the product information acquisition unit 50 may acquire the product composition information 34 in advance from the information management server 12, or may acquire the product composition information 34 in response to an instruction from the user.

Then, with reference to the product composition table being the product composition information 34, the product specification unit 52 specifies a product corresponding to the module ID and the version of the module indicated by the module information 26, as a product installed in the image forming device 10 (S04). In this case, the product specification unit 52 may specify a product by further using information indicative of the model of the image forming device 10 indicated by the device information 24. If a common module is installed in the image forming device 10, the product specification unit 52 specifies a product installed in the image forming device 10 on the basis of the module ID (and the device information 24) without use of the version of the common module. For another example, the product specification unit 52 may specify a product on the basis of information on another module without use of the common module.

Then, the display controller 54 causes the UI unit 44 to display the product specified by the product specification unit 52 (S05). For example, as shown in FIG. 11, the display controller 54 causes the UI unit 44 to display the product display screen 56, and causes the product display screen 56 to display the device ID of each image forming device 10 retrieved in step S01. When the user designates the device ID of a specific image forming device 10 in the product display screen 56, the display controller 54 causes a list of products specified by the product specification unit 52 for the image forming device 10 designated by the user to be displayed in the product display screen 56.

If plural products are specified by the product specification unit 52 and the plural products have the dependency of the inclusion case α, the display controller 54 inhibits a small product in the plural products from being displayed in the product display screen 56. For another example, the display controller 54 may cause a small product to be displayed in the product display screen 56 in a state in which an operation by a user on the small product is invalid.

If plural products are specified by the product specification unit 52 and the plural products have the dependency of the exact match case γ, the display controller 54 causes the plural products to be displayed in the product display screen 56, as a product group belonging to the same group.

As described above, according to the first exemplary embodiment, a product installed in an image forming device 10 is specified by the module information 26 acquired from the image forming device 10. Accordingly, even if the product installed in the image forming device 10 is not managed, the product is specified. For example, a product installed in an image forming device 10 is specified by a remote operation by the software management device 14.

Also, by changing specification control or display control on a product in accordance with the dependency of modules between plural products, the problem expected to occur if the plural products having the dependency are specified is prevented from occurring.

As described above, by controlling product display in accordance with the dependency, for example, when a user executes an operation, such as installation of a product into an image forming device 10, update of the product, or uninstallation of the product from the image forming device 10, information useful for the user is provided, and hence the product is properly managed.

Modifications

Modifications according to the first exemplary embodiment are described below.

FIG. 13 shows a configuration of an information management server 12A according to a modification. The information management server 12A includes a storage unit 32A instead of the storage unit 32 of the information management server 12 according to the above-described first exemplary embodiment. The configuration other than the storage unit 32A is similar to the configuration of the information management server 12 according to the first exemplary embodiment. The storage unit 32A stores user contract information 62 in addition to the information stored in the storage unit 32.

The user contract information 62 is information indicative of a product contracted with a user, that is, a product allowed to be used by the user (a product available for the user). The user contract information 62 is associated with user identification information for identifying the user who made the contract (for example, user ID).

Figure 14:
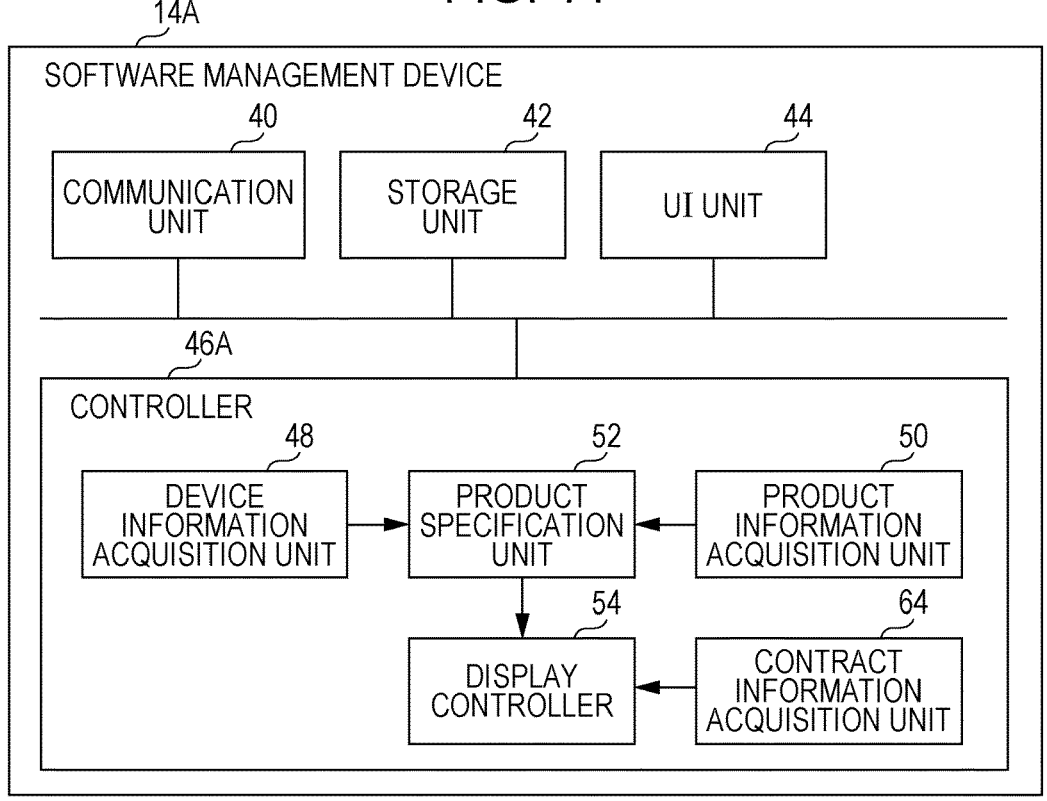
FIG. 14 is a block diagram showing a software management device according to a modification of the first exemplary embodiment.

FIG. 14 shows the configuration of a software management device 14A according to the modification. The software management device 14A includes a controller 46A instead of the controller 46 of the software management device 14 according to the above-described first exemplary embodiment. The configuration other than the controller 46A is similar to the configuration of the software management device 14 according to the first exemplary embodiment. The controller 46A includes a contract information acquisition unit 64 in addition to the configuration of the controller 46.

The contract information acquisition unit 64 has a function of acquiring the user contract information 62 from the information management server 12A. For example, a user inputs user identification information, such as a user ID and a password, by using the UI unit 44, and thereby logs into the software management system. The contract information acquisition unit 64 acquires the user contract information 62 of the user who has logged into the software management system, from the information management server 12A.

In the modification, the display controller 54 controls display of a product specified by the product specification unit 52 in accordance with the contract state of the user indicated by the user contract information 62 acquired by the contract information acquisition unit 64. The display controller 54 causes the UI unit 44 to display a product contracted with the user, and inhibits the UI unit 44 from displaying a product not contracted with the user, in a product group specified by the product specification unit 52. As described above, in the exact match case γ, plural components composed of the same module installed in an image forming device 10 are specified and displayed on the UI unit 44. The plural products may include a product contracted with the user, in addition to a product not contracted with the user. That is, the product specification unit 52 may specify a product not contracted with the user in the exact match case γ because the product specification unit 52 specifies a product composed of a module installed in the image forming device 10. For example, in a case where products A, B, and C are composed of the same module, it is assumed that a user makes a contract for use of the product A, that is, is given with a license of the product A, and the product A (a module composing the product A) is installed in an image forming device 10. In this case, the product specification unit 52 acquires the module information 26 indicative of the module from the image forming device 10, and specifies the products A, B, and C as the products composed of the module. The products B and C are specified as products installed in the image forming device 10 although not contracted with the user. Since the products B and C are not products contracted with the user, the user is not allowed to use the products B and C. When such products B and C are displayed, the user may be confused, and hence to address this, the display controller 54 inhibits the UI unit 44 from displaying the products B and C not contracted with the user. Accordingly, the above-described problem is addressed.

Second Exemplary Embodiment

Figure 15:
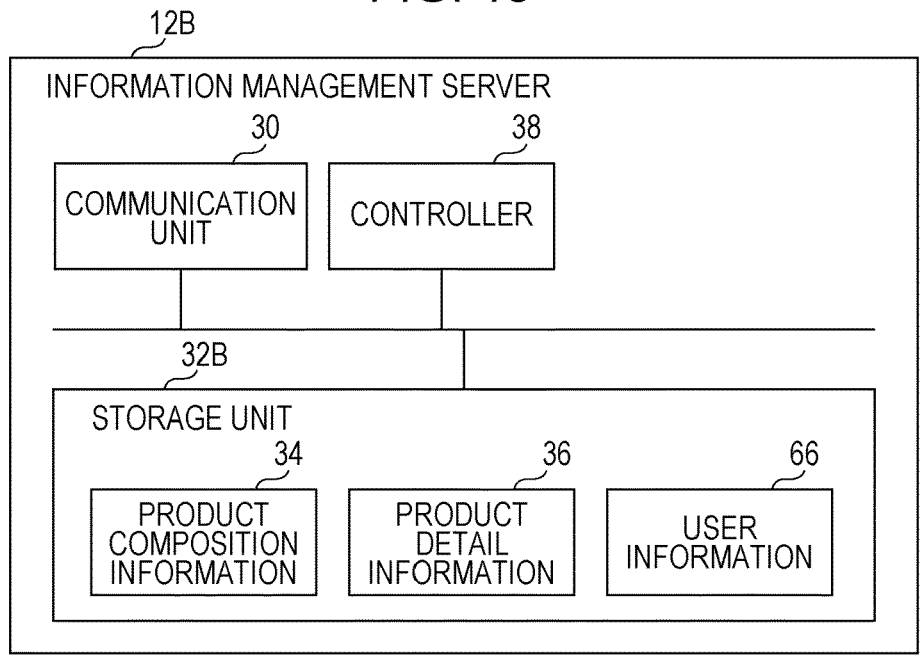
FIG. 15 is a block diagram showing an information management server according to a second exemplary embodiment.
Figure 16:
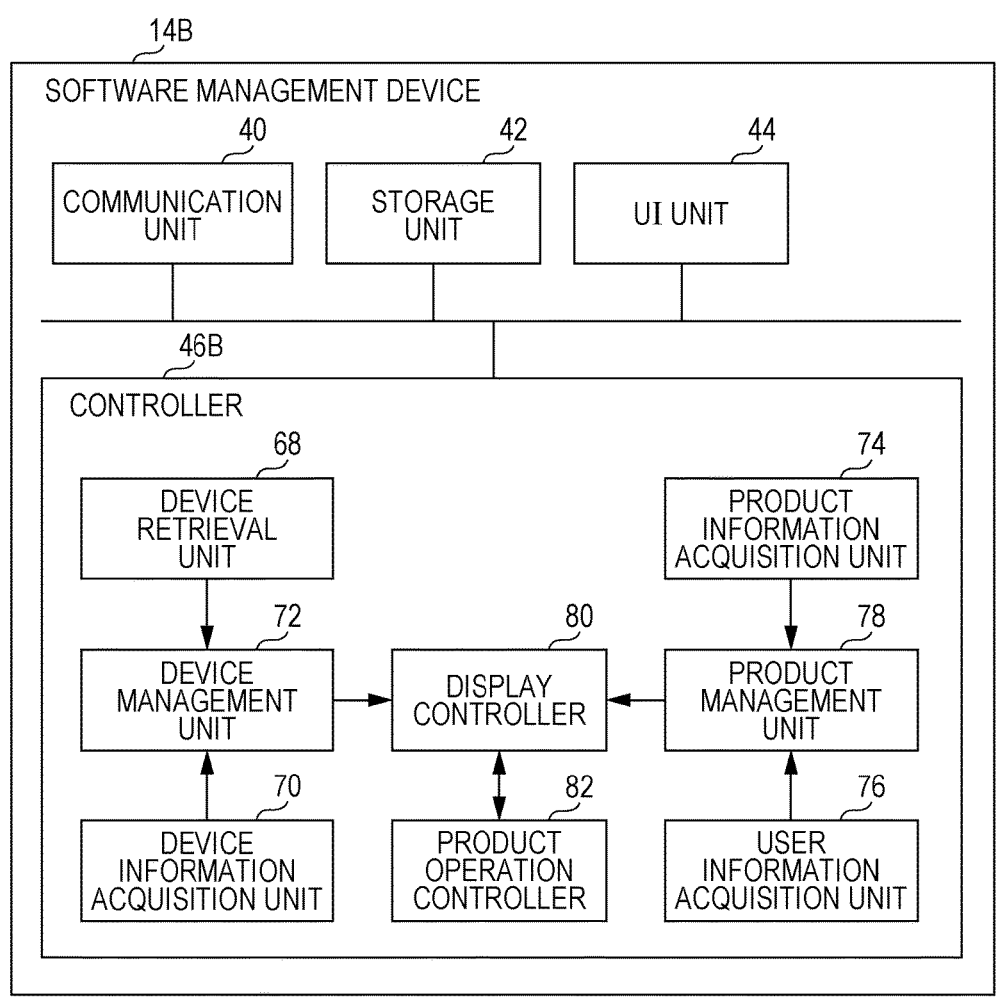
FIG. 16 is a block diagram showing a software management device according to the second exemplary embodiment.

A software management system as an information processing system according to a second exemplary embodiment of the invention is described. FIG. 15 shows an example of an information management server 12B according to the second exemplary embodiment. FIG. 16 shows an example of a software management device 14B according to the second exemplary embodiment. The software management system according to the second exemplary embodiment includes an image forming device 10 similarly to the first exemplary embodiment, includes the information management server 12B instead of the information management server 12 according to the first exemplary embodiment, and includes the software management device 14B instead of the software management device 14 according to the first exemplary embodiment. Respective devices are described below in detail.

The information management server 12B is described below with reference to FIG. 15. The information management server 12B includes a storage unit 32B instead of the storage unit 32 of the information management server 12 according to the above-described first exemplary embodiment. The configuration other than the storage unit 32B is similar to the configuration of the information management server 12 according to the first exemplary embodiment. The storage unit 32B stores user information 66 in addition to the information stored in the storage unit 32.

The user information 66 is information indicative of a product allowed to be used by a user (a product available for a user). A product available for a user may be a product purchased by a user (for example, a product contracted with a user) or a product that may be used by a user without charge (for example, a product given with a free license). It is to be noted that the user contract information 62 according to the modification of the first exemplary embodiment may be used instead of the user information 66.

The software management device 14B is described below in detail with reference to FIG. 16. The software management device 14B includes a controller 46B instead of the controller 46 of the software management device 14 according to the above-described first exemplary embodiment. The configuration other than the controller 46B is similar to the configuration of the software management device 14 according to the first exemplary embodiment.

A device retrieval unit 68 has a function of retrieving an image forming device 10 being a device included in the software management system.

A device information acquisition unit 70 acquires the device information 24 and the module information 26 from each image forming device 10 included in the software management system (for example, each image forming device 10 retrieved by the device retrieval unit 68).

A device management unit 72 has a function of storing the device information 24 and the module information 26 acquired by the device information acquisition unit 70 and managing each image forming device 10 included in the software management system. For example, the device management unit 72 manages a product installed in each image forming device 10. Similarly to the product specification unit 52 according to the above-described first exemplary embodiment, the device management unit 72 may specify a product installed in an image forming device 10 on the basis of the module information 26 (and the device information) acquired from the image forming device 10, and the product composition information 34 acquired from the information management server 12B, for each image forming device 10. The device management unit 72 may specify a product installed in an image forming device 10 by another method. For example, information indicative of a product installed in an image forming device 10 may be stored in the storage unit 22 of the image forming device 10. In this case, the device information acquisition unit 70 acquires information indicative of the product from the image forming device 10, and the device management unit 72 specifies the product installed in the image forming device 10 on the basis of the information. For another example, information indicative of a product installed in each image forming device 10 may be stored in an external device such as a server. In this case, the device information acquisition unit 70 acquires information indicative of the product from the external device, and the device management unit 72 specifies the product installed in the image forming device 10 on the basis of the information.

A product information acquisition unit 74 has a function of acquiring the product composition information 34 and the product detail information 36 from the information management server 12B. It is to be noted that the product composition information 34 and the product detail information 36 acquired by the product information acquisition unit 74 may be stored in the storage unit 42.

User information acquisition unit 76 has a function of acquiring the user information 66 from the information management server 12B. For example, a user inputs user identification information, such as a user ID and a password, by using the UI unit 44, and thereby logs into the software management system. The user information acquisition unit 76 acquires the user information 66 of the user who has logged into the software management system, from the information management server 12B.

A product management unit 78 has a function of holding the product composition information 34, the product detail information 36, and the user information 66 acquired from the information management server 12B, and managing a product.

A display controller 80 controls display of a product installed in an image forming device 10 (hereinafter, referred to as "installed product") and a product available for a user (hereinafter, referred to as "available product"). The display controller 80 causes the UI unit 44 to display, for example, an installed product and an available product. Of course, the display controller 80 may cause a display device to display a product on a device other than the software management device 14B. For example, information indicative of an installed product and information indicative of an available product may be transmitted to a terminal device (for example, a personal computer (PC), a tablet PC, a smart phone, or a mobile phone), and the display controller 80 may cause a display device of the terminal device to display the products. Of course, the software management device 14B may be configured of a terminal device.

Also, the display controller 80 controls display of a product on the basis of the dependency of modules between plural products (for example, between plural available products, between an installed product and an available product, between plural installed products). The display control based on the dependency is described later in detail.

A product operation controller 82 has a function of controlling an operation by a user on a product. An operation on a product may be, for example, installation (registration) of a product in an image forming device 10, update of a product, and uninstallation (deletion) of a product from an image forming device 10. The product operation controller 82 controls an operation by a user relating to a product on an image forming device 10, on the basis of the dependency of modules between plural products (for example, between plural available products, between an installed product and an available product, between plural installed products). The operation control based on the dependency is described later in detail.

The software management system according to the second exemplary embodiment is described below with a specific example.

The product composition information 34 according to the second exemplary embodiment is described with reference to FIG. 17. FIG. 17 shows a component composition table being an example of the product composition information 34.

In the product composition table, product identification information for identifying a product being software (for example, product ID), product attribute information indicative of the version of the product, information indicative of the name of the product, information indicative of the release date of the product, information indicative of the model of an image forming device 10 corresponding to the product (the model of an image forming device 10 into which the product may be installed), and information indicative of one or plural modules composing the product are associated with one another. The information indicative of the module includes, for example, a module ID, module attribute information indicative of the version of the module, and information indicative of the model of an image forming device 10 corresponding to the module (the model of an image forming device 10 into which the module may be installed).

For example, a product A (version 1.0) is a product composed of a module A (version 1.0). A product D (version 1.0) is a product composed of plural modules (module C (version 1.0) and module D (version 1.0)). Also, a module X (version 1.0) is a common module shared by plural products, that is, a module included in plural products. By referencing the product composition table, a common module is specified.

By referencing the product composition table, the dependency of modules between respective products is specified. Also, by referencing the product composition table, the display controller 80 specifies the dependency of modules between plural products (for example, between plural available products, between an installed product and an available product, between plural installed products), and controls display of products on the basis of the dependency. Also, by referencing the product composition table, the product operation controller 82 specifies the dependency of modules between plural products (for example, between plural available products, between an installed product and an available product, or between plural installed products), and controls an operation by a user on a product on the basis of the dependency.

It is to be noted that the device management unit 72 may specify a product installed in an image forming device 10 by referencing the product composition table, similarly to the product specification unit 52 according to the first exemplary embodiment. For example, if information indicative of a product installed in an image forming device 10 is not acquired from the image forming device 10 or a server, the device management unit 72 specifies a product installed in the image forming device 10 on the basis of the module information 26 (and the device information 24) acquired from the image forming device 10 and the product composition table. Of course, a product installed in an image forming device 10 may be specified by another method.

Figure 6:
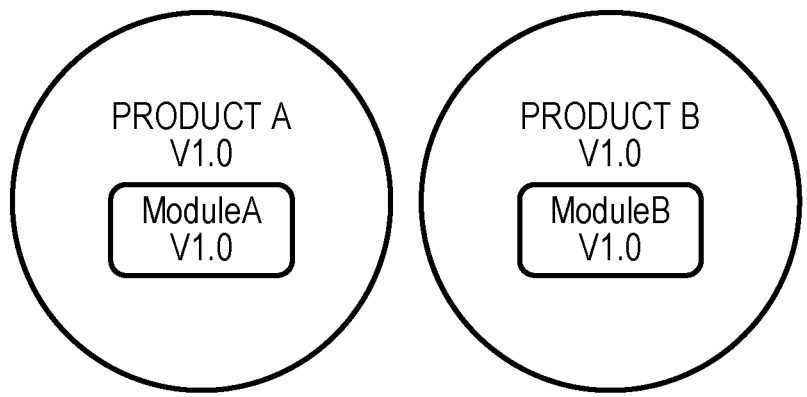
FIG. 6 is an illustration for explaining a product relation corresponding to an independent case.
Figure 7:
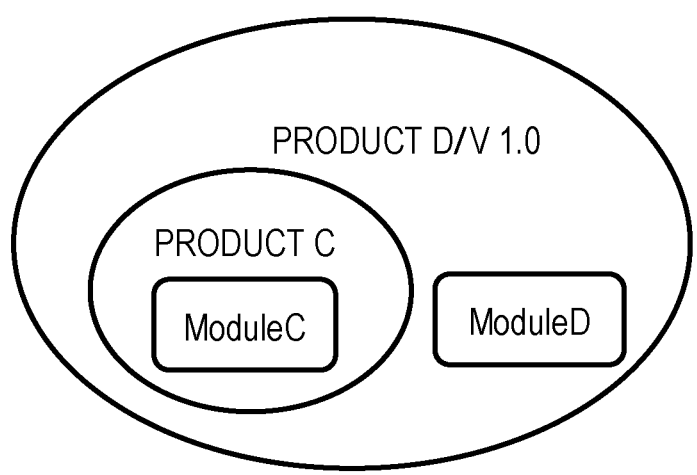
FIG. 7 is an illustration for explaining a product relation corresponding to an inclusion case.
Figure 8:
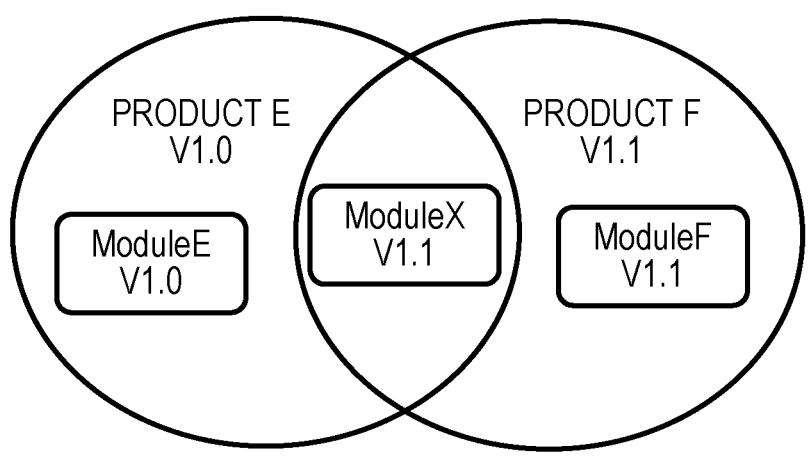
FIG. 8 is an illustration for explaining a product relation corresponding to a common component use case.
Figure 9:
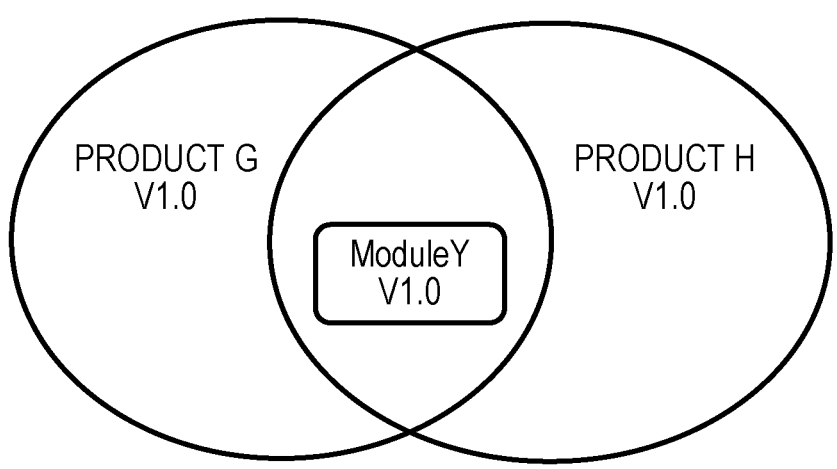
FIG. 9 is an illustration for explaining a product relation corresponding to an exact match case.

Also in the second exemplary embodiment, similarly to the first exemplary embodiment, the independent case shown in FIG. 6, the inclusion case α shown in FIG. 7, the common component use case β shown in FIG. 8, and the exact match case γ shown in FIG. 9 may be generated as dependencies of modules between plural products. These cases are the same as the cases according to the first exemplary embodiment, and hence the description is omitted here.

In the second exemplary embodiment, for example, the product display control by the display controller 80 and the product operation control by the product operation controller 82 are changed in accordance with the dependency of modules between plural products. The controls are described below in detail with reference to FIG. 18. FIG. 18 shows a table of controls according to the dependencies of modules. In this table, a problem in product management, control for installation, control for update, and control for uninstallation are associated with one another for each case.

Although not shown in the table in FIG. 18, the independent case is described. In a case where the dependency of modules is the independent case, that is, in a case where respective modules are independent between plural products (for example, between plural available products, between an installed product and an available product, or between plural installed products) as shown in FIG. 6, it is expected that a problem does not occur in product management. In the independent case, the display controller 80 causes the UI unit 44 to display an installed product and an available product without limitation on display of products. Also, the product operation controller 82 does not invalidate an operation on the installed product and the available product and processes the operation as being valid. That is, when a user instructs update or uninstallation of an installed product, the product operation controller 82 updates or uninstalls the installed product in response to the instruction from the user. Also, when a user instructs installation of an available product, the product operation controller 82 installs the available product into an image forming device 10 designated by the user, in response to the instruction from the user.

The inclusion case α is described below. In a case where the dependency of modules is the inclusion case α, that is, as shown in FIG. 7, in a case where a product D (referred to as "large product") includes another product C (referred to as "small product"), a problem may occur in product management. For example, an operation, such as installation (registration), update, or uninstallation (deletion) of a product, may be executed by a user, in a screen in which product are displayed. In this case, for example, in a case where a large product is installed in an image forming device 10 (that is, in a case where a large product is an installed product), even if a small product is installed into the image forming device 10, the function is not changed, and hence it is expected that the user may be confused. Also, in a case where a large product and a small product are installed in the same image forming device 10 (that is, in a case where a large product and a small product are installed products), when the small product is updated or uninstalled, a module composing the small product may be updated or uninstalled by the update or uninstallation of the small product. Accordingly, the composition of the large product including the module may be influenced. For example, when the small product is uninstalled, the module composing the small product is also deleted from the large product. Hence, a problem may occur in use of the large product in a situation unexpected by the user.

To address the problem of the inclusion case α, the following control is executed as control for installation. For example, in a case where a large product is installed in an image forming device 10 (a large product is an installed product) and a small product is an available product and is not installed in the image forming device 10, the product operation controller 82 processes an installation operation of the small product into the image forming device 10 as being invalid. That is, the product operation controller 82 does not accept the installation operation of the small product, or even if the product operation controller 82 accepts the operation, the product operation controller 82 does not execute processing corresponding to the operation. Accordingly, installation of a small product in an image forming device 10 with a large product installed is prevented and the above-described problem is addressed. For example, the display controller 80 causes the UI unit 44 to display a small product as an available product. If a user instructs installation of a small product into an image forming device 10 with a large product installed, the product operation controller 82 does not accept the instruction for installation from the user. Accordingly, a small product is not installed into an image forming device 10 with a large product installed. For another example, if a user instructs installation of a small product into an image forming device 10 with a large product installed, even if the product operation controller 82 accepts the instruction for installation from the user, the product operation controller 82 may process the instruction as being invalid. Even in this case, a small product is not installed into an image forming device 10 with a large product installed. It is to be noted that even if the small product is an available product, the display controller 80 may inhibit the UI unit 44 from displaying the small product as an available product.

If a user instructs installation of a small product into an image forming device 10, the product operation controller 82 installs the small product into the image forming device 10 without a large product installed in response to the instruction for installation from the user.

Also, as control for update, the following control is executed. For example, in a case where a large product and a small product are installed in the same image forming device 10 (in a case where a large product and a small product are installed products), the product operation controller 82 processes an update operation on the small product as being invalid, as control for update. For example, the display controller 80 causes the UI unit 44 to display a small product and a large product as installed products in an image forming device 10 with the small product and the large product installed. If a user instructs update of a small product in an image forming device 10 with a large product installed, the product operation controller 82 does not accept the instruction for update from the user. Accordingly, update of a small product is not executed in an image forming device 10 with a large product installed. For another example, if a user instructs update of a small product in an image forming device 10 with a large product installed, even if the product operation controller 82 accepts the instruction for update from the user, the product operation controller 82 may process the instruction as being invalid. Even in this case, update of a small product is not executed in an image forming device 10 with a large product installed. For another example, in a case where a large product and a small product are installed in the same image forming device 10, the display controller 80 may inhibit the UI unit 44 from displaying the small product as an installed product in the image forming device 10. By executing the above-described control, the influence on a large product caused by update of a small product may be prevented.

If a user instructs update of a small product in an image forming device 10 without a large product installed, the product operation controller 82 updates the small product in the image forming device 10 without a large product installed in response to the instruction for update from the user.

Also, as control for uninstallation, the following control is executed. For example, in a case where a large product and a small product are installed in the same image forming device 10 (in a case where a large product and a small product are installed products), the display controller 80 inhibits the UI unit 44 from displaying the small product as an installed product in the image forming device 10, as control for uninstallation. For another example, as control for uninstallation, the product operation controller 82 may process an uninstallation operation of a small product into an image forming device 10 with a large product installed as being invalid. For example, the display controller 80 causes the UI unit 44 to display a small product and a large product as installed products in an image forming device 10 with the small product and the large product installed. If a user instructs uninstallation of a small product from an image forming device 10 with a large product installed, the product operation controller 82 does not accept the instruction for uninstallation from the user. Accordingly, a small product is not uninstalled from an image forming device 10 with a large product installed. For another example, if a user instructs uninstallation of a small product from an image forming device 10 with a large product installed, even though the product operation controller 82 accepts the instruction for uninstallation from the user, the product operation controller 82 may process the instruction as being invalid. Even in this case, a small product is not uninstalled from an image forming device 10 with a large product installed. By executing the above-described control, the influence on a large product caused by uninstallation of a small product may be prevented.

If a user instructs uninstallation of a small product from an image forming device 10 without a large product installed, the product operation controller 82 uninstalls the small product from the image forming device 10 without a large product installed in response to the instruction for uninstallation from the user.

The common component use case β is described below. In a case where the dependency of modules is the common component use case β, that is, as shown in FIG. 8, for example, in a case where a product E and another product F share the same module, a problem may occur in product management. For example, in a case where the products E and F are installed in the same image forming device 10, when one product (for example, product E) is uninstalled, a module composing the one product is uninstalled by the uninstallation of the one product. Accordingly, the composition of the other product (for example, product F) including the module is influenced, and a problem may occur in use of the other product in a situation unexpected by the user.

In a case where the dependency of modules is the common component use case β, a problem is not caused by installation or update of a product. Hence, if a user instructs installation or update of a product, the product operation controller 82 installs or updates the product in response to the instruction without limitation on an operation on the product. Also, the display controller 80 causes the UI unit 44 to display an installed product and an available product without limitation on display of products. If a product is uninstalled from an image forming device 10, the product operation controller 82 does not delete a common module composing the product (a module also used in another product) from the image forming device 10. When the product operation controller 82 receives an instruction for uninstallation of the product, the product operation controller 82 specifies a module composing the product by referencing the product composition table. If the product includes a common module, the product operation controller 82 does not delete the common module from an image forming device 10 with the product installed. Accordingly, the influence on a product caused by uninstallation of another product may be prevented.

The exact match case γ is described below. In a case where the dependency of modules is the exact match case γ, that is, in a case where plural products (for example, products G and H) are composed of the same module (for example, module Y) as shown in FIG. 9, if the module is installed into an image forming device 10, the plural products (for example, products G and H) may be recognized as products installed in the image forming device 10. For example, similarly to the first exemplary embodiment, when a product installed in an image forming device 10 is specified on the basis of a module installed in the image forming device 10, plural products may be specified. Describing with the above-described example, in a case where the module Y is installed in an image forming device 10, if a product installed in the image forming device 10 is specified on the basis of the module Y, the products G and H are specified as products installed in the image forming device 10. Hence, if a product is installed into an image forming device 10, another product having the dependency of the exact match case γ with the one product is also handled as being installed in the image forming device 10. Accordingly, a user may feel uncomfortable.

To address the problem of the exact match case γ, the following control is executed as control for installation. In a case where a user executes an installation operation of an available product, if another available product having the dependency of the exact match case γ with the available product is present, the display controller 80 controls display of products to indicate that plural available products mutually having the dependency of the exact match case γ are going to be installed into the image forming device 10, in a manner noticeable by the user. For example, the display controller 80 may cause the UI unit 44 to display information indicative of that the plural products are going to be installed (for example, message or image), or may cause the UI unit 44 to display that images (for example, icons) indicating the plural products are simultaneously moved in accordance with an operation by the user. By executing such display control, the problem in the exact match case γ at installation operation is addressed.

Also, as control for update, the following control is executed. In a case where a user executes an update operation on an installed product in an image forming device 10 instructed by a user, if another installed product having the dependency of the exact match case γ with the installed product is installed in the image forming device 10, the display controller 80 controls display of products to indicate that plural installed products mutually having the dependency of the exact match case γ are going to be updated, in a manner noticeable by the user. For example, the display controller 80 may cause the UI unit 44 to display information indicative of that the plural products are going to be updated (for example, message or image), or may cause the UI unit 44 to display the plural products as a product group belonging to the same group. By executing such display control, the problem in the exact match case γ at update operation is addressed.

Also, as control for uninstallation, the following control is executed. In a case where an uninstallation operation of an installed product is executed for an image forming device 10 instructed by a user, if another installed product having the dependency of the exact match case γ with the installed product is installed in the image forming device 10, the display controller 80 controls display of products to indicate that plural installed products mutually having the dependency of the exact match case γ are going to be uninstalled, in a manner noticeable by the user. For example, the display controller 80 may cause the UI unit 44 to display information indicative of that the plural products are going to be uninstalled (for example, message or image), or may cause the UI unit 44 to display the plural products as a product group belonging to the same group. By executing such display control, the problem in the exact match case γ at uninstallation is addressed.

Figure 19:
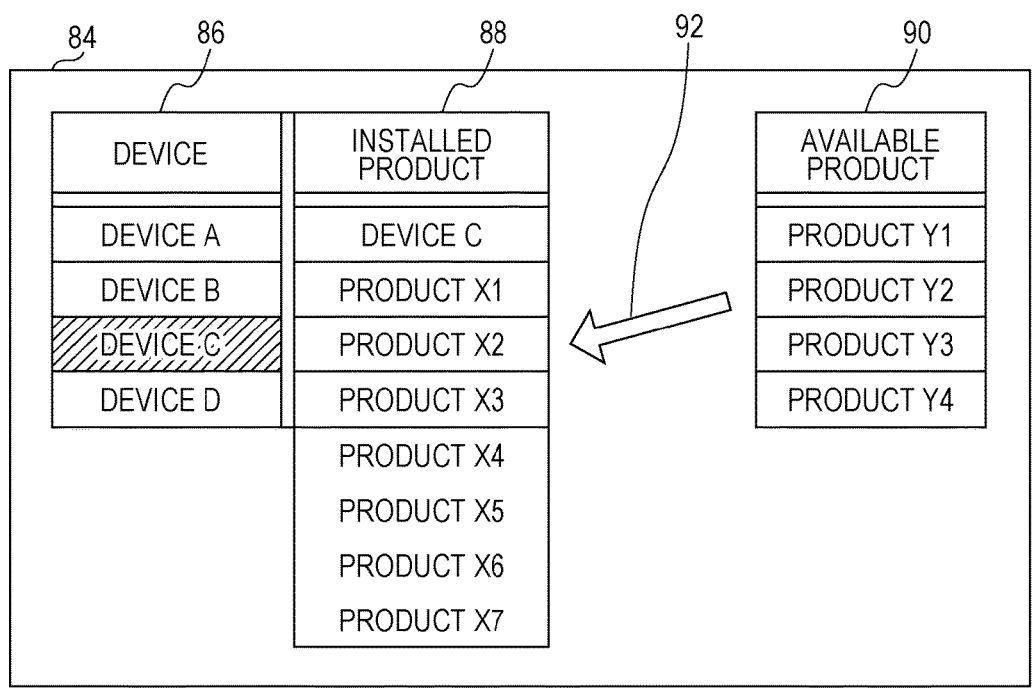
FIG. 19 is an illustration showing an example of a product display screen.

A product display screen is described below with reference to FIG. 19. FIG. 19 shows an example of the screen. For example, if a user inputs user identification information, such as a user ID and a password, by using the UI unit 44 and thereby logs into the software management system, the display controller 80 causes the UI unit 44 to display a product display screen 84. In the product display screen 84, a list of device information (for example, device IDs) for identifying image forming devices 10 being devices included in the software management system is displayed as indicated by reference sign 86. The device retrieval unit 68 retrieves image forming devices 10 included in the software management system, and the device information acquisition unit 70 acquires the device information 24 from each retrieved image forming device 10. The display controller 80 causes the list of device IDs included in the device information 24 to be displayed in the product display screen 84. In the example shown in FIG. 19, devices A, B, C, and D are displayed.

When the user designates a specific device from the device list by using the UI unit 44, the display controller 80 causes a list of products (installed products) installed in the image forming device 10 designated by the user to be displayed in the product display screen 84, as indicated by reference sign 88. In the example shown in FIG. 19, the device C is designated by a user, and a list of products installed in the device C (for example, products X1 to X7) is displayed in the product display screen 84. It is to be noted that, similarly to the first exemplary embodiment, the products X4 to X7 are products composed of the same module, and hence are displayed as a group.

Also, a list of products that may be used by a logged-in user (available products) is displayed in the product display screen 84 as indicated by reference sign 90. When a user logs into the software management system, the user information acquisition unit 76 acquires the user information 66 on the user from the information management server 12B. The display controller 80 causes a list of product IDs included in the user information 66 (IDs of available products) to be displayed in the product display screen 84. In the example shown in FIG. 19, products Y1 to Y4 are displayed in the product display screen 84 as products that may be used by the logged-in user.

In the product display screen 84, an operation, such as installation, update, or uninstallation of a product, is executed. For example, by using the UI unit 44, when a user selects a product to be installed (for example, product Y1) from a list of available products, and drags and drops an image (for example, icon) indicative of the product Y1 to and in a display column of installed products in the device C (column indicated by reference sign 88) as indicated by reference sign 92, the product operation controller 82 installs the product Y1 into the device C. The product operation controller 82 may install the product Y1 into the device C when the image indicative of the product Y1 is dragged to and dropped in an image (for example, icon) indicative of the device C.

Also, by using the UI unit 44, when a user selects a product to be updated (for example, product X1) from a list of installed products and instructs update, the product operation controller 82 updates the product X1 in the device C.

Also, by using the UI unit 44, when a user selects a product to be uninstalled (for example, product X2) from installed products and instructs uninstallation, the product operation controller 82 uninstalls the product X2 from the device C.

If any one of the dependencies including the inclusion case α, common component use case β, and exact match case γ is present between plural products (for example, between plural available products, between an installed product and an available product, between plural installed products), product display control and product operation control are executed in accordance with the dependency in the product display screen 84. The controls are described below in detail with reference to FIG. 20. FIG. 20 shows an example of a table for control at each timing.

Figure 21:
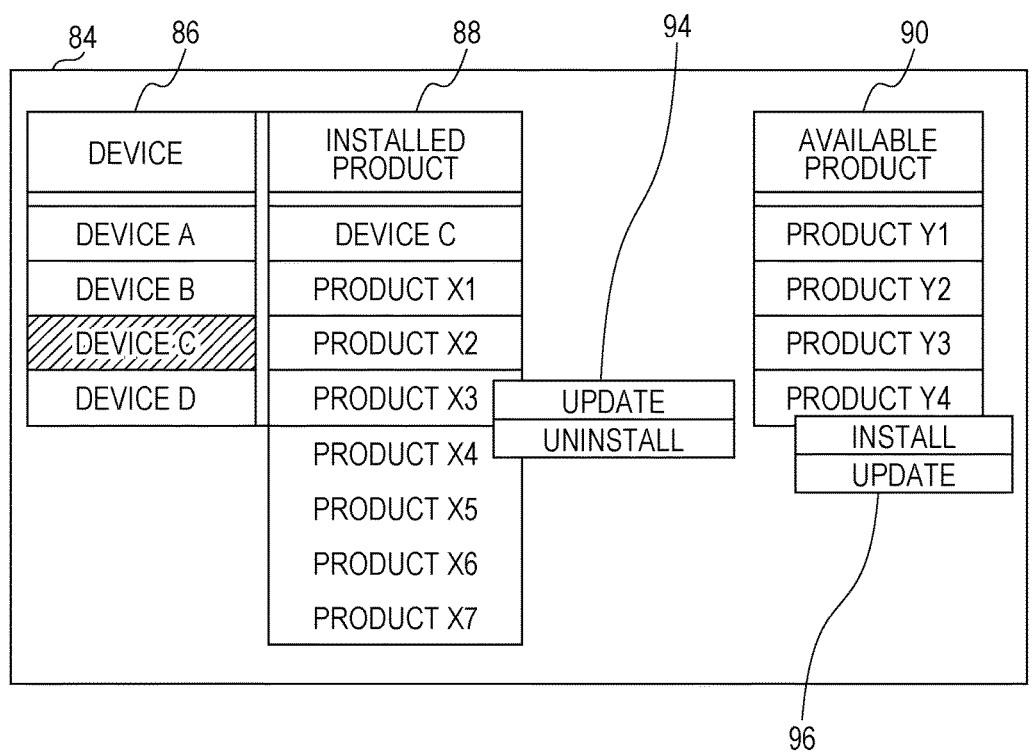
FIG. 21 is an illustration showing an example of a product display screen.

First, (1) control at display of a product is described. The display controller 80 causes a list of products (available products) that may be used by a logged-in user and a list of products (installed products) installed in an image forming device 10 (for example, device C) designated by a user in the product display screen 84 to be displayed in the product display screen 84. FIG. 21 shows an example of the product display screen 84.

If the dependency of the inclusion case α is present between plural products installed in the device C (plural installed products), the display controller 80 inhibits a product corresponding to a small product from being displayed in the product display screen 84. For example, the display controller 80 causes a list of installed products to be displayed in the product display screen 84 while an installed product corresponding to a small product is not included in the list of installed products. The display controller 80 may cause a list of available products to be displayed in the product display screen 84 while an available product corresponding to a small product is not included in the list of available products. For example, in the example shown in FIG. 21, it is assumed that a product X1 and a product X8 (not shown) have the dependency of the inclusion case α, the product X1 is a large product, and the product X8 is a small product. Also, it is assumed that the product X1 and the product X8 are installed in the device C. In this case, the display controller 80 inhibits the product X8 (small product) from being displayed in the list of installed products. Also, even if the product X8 (small product) corresponds to an available product, the display controller 80 inhibits the product X8 (small product) from being displayed in the list of available products. Accordingly, the influence on a large product by an operation on a small product is prevented.

For another example, the display controller 80 may cause a small product to be displayed in a list of installed products, and the product operation controller 82 may process an update or uninstallation operation of the small product as being invalid. For example, when a user designates a product to be operated (installed product) from a list of installed products, a button image 94 for instructing update or uninstallation is displayed as shown in FIG. 21. When the user instructs update or uninstallation with the button image 94, the product operation controller 82 executes processing in accordance with the instruction. In this case, the product operation controller 82 processes the update or uninstallation operation of the small product as being invalid. For example, if a user instructs update or uninstallation with the button image 94, the product operation controller 82 processes the instruction as being invalid (for example, does not accept the instruction). Accordingly, the influence on a large product by an operation on a small product is prevented.

Also, if a small product corresponds to an available product, the display controller 80 may cause the small product to be displayed in a list of available products, and the product operation controller 82 may process an update operation on the small product as being invalid. For example, when a user designates a product to be operated (available product) from a list of available products, a button image 96 for instructing installation or update is displayed as shown in FIG. 21. When the user instructs installation or update with the button image 96, the product operation controller 82 executes processing in accordance with the instruction. In this case, the product operation controller 82 processes the update operation on the small product as being invalid. The product operation controller 82 may process the installation operation of the small product as being invalid. For example, if the user instructs update or installation with the button image 96, the product operation controller 82 processes the instruction as being invalid (for example, does not accept the instruction). Accordingly, the influence on a large product by an operation on a small product is prevented.

Next, (2) control in a period from operation selection to operation execution is described. In a case where the dependency of the inclusion case α is present between an installed product and an available product, if the installed product is a large product and the available product is a small product, the product operation controller 82 processes an installation operation of a small product into an image forming device 10 with a large product installed as being invalid. Also, in a case where the dependency of the inclusion case α is present between plural installed products, the product operation controller 82 processes an update operation on a small product as being invalid in an image forming device 10 with a large product installed. Accordingly, the influence on a large product by an operation on a small product is prevented.

Figure 22:
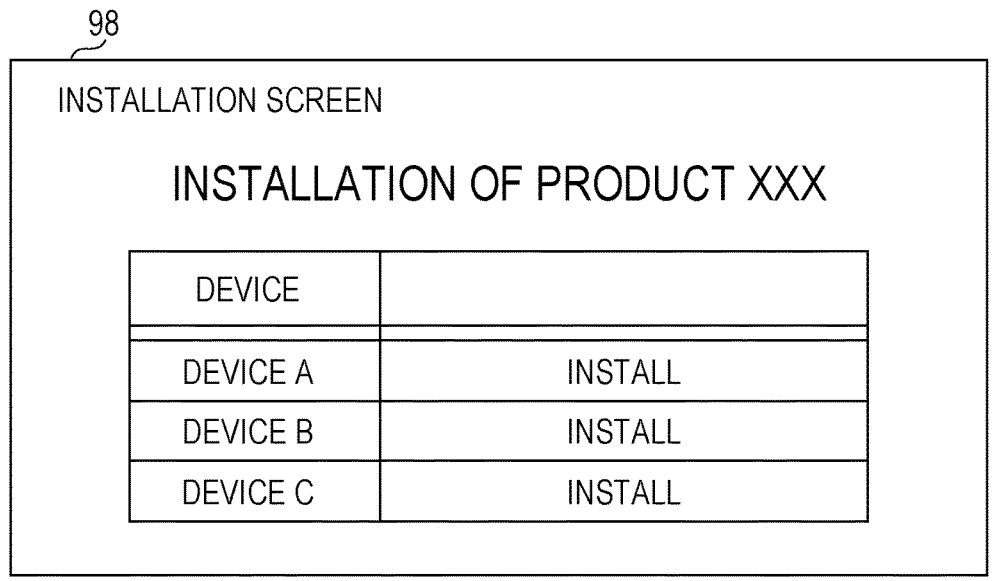
FIG. 22 is an illustration showing an example of an installation screen.

FIG. 22 shows an example of a screen at installation of a product. For example, when a user designates a product to be installed from a list of available products in a product display screen, the display controller 80 causes the UI unit 44 to display an installation screen 98. The installation screen 98 displays a list of device IDs of image forming devices 10 being candidates of installation destination. The image forming device 10 being a candidate of an installation destination is, for example, an image forming device 10 retrieved by the device retrieval unit 68. In the installation screen 98, when a user designates an image forming device 10 being an installation destination, the product operation controller 82 installs a product to be installed into the designated image forming device 10. In a case where the dependency of the inclusion case α is present between an installed product and a product to be installed (available product), if the installed product is a large product and the product to be installed is a small product, the display controller 80 inhibits the device ID of an image forming device 10 with a large product installed from being displayed in the installation screen 98. For example, even in a case where a device D is included in the software management system, if a large product is installed in the device D, the device D is not displayed in the installation screen 98. Accordingly, the influence on a large product caused by installation of a small product may be prevented.

Figure 23:
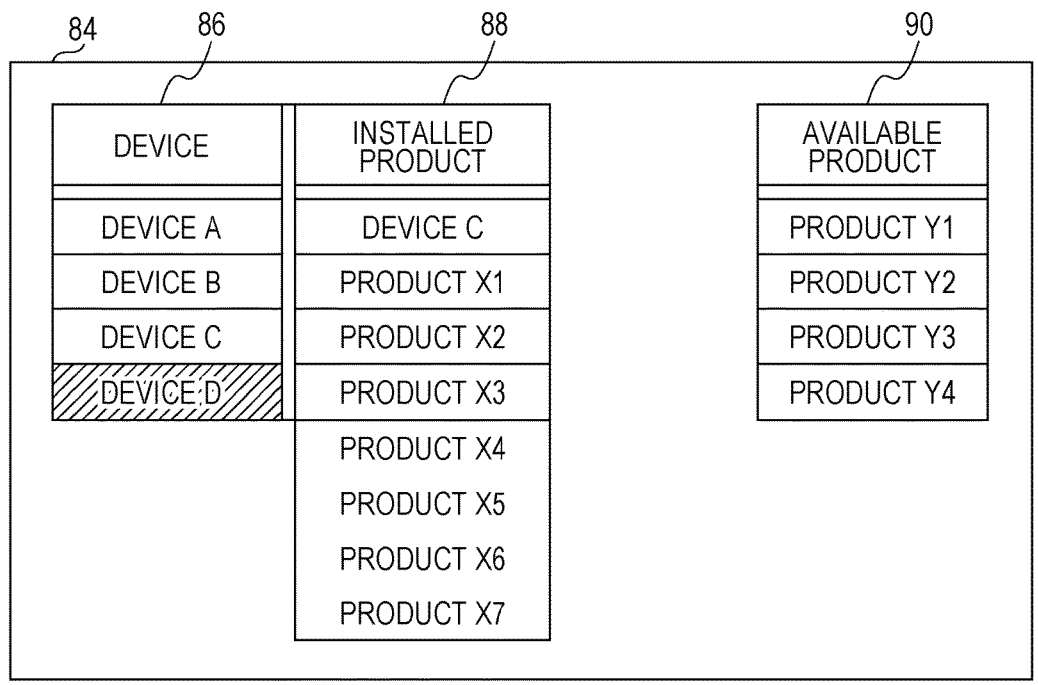
FIG. 23 is an illustration showing an example of a product display screen.

FIG. 23 shows an example of different control. When a user designates a product to be installed from a list of available products, the display controller 80 may cause a device ID of an image forming device 10 (for example, device D) with a product corresponding to a large product installed to be displayed in the product display screen 84 in a discriminated manner (for example, in a grayed out manner) with respect to a product to be installed in a device display column. The product operation controller 82 processes an installation operation of a product to be installed as being invalid, for an image forming device 10 displayed in a grayed out manner. Accordingly, the influence on a large product caused by installation of a small product may be prevented.

Next, (3) control at operation execution is described. For example, in a case where a user executes an installation operation of an available product, if another available product having the dependency of the exact match case γ with the available product is present, the display controller 80 controls display to indicate that plural available products mutually having the dependency of the exact match case γ are going to be installed into an image forming device 10, in a manner noticeable by the user. For example, in the example shown in FIG. 21, it is assumed that products Y1, Y2, and Y3 are products mutually having the dependency of the exact match case γ, and a user installs the product Y1 into an image forming device 10 (for example, device C) by using the UI unit 44. For example, by using the UI unit 44, when a user designates an image (for example, icon) indicative of the product Y1, and moves (for example, drags) the image indicative of the product Y1 to an image (for example, icon) indicative of the device C or a column of an installed product of the device C, the display controller 80 also moves (for example, drags) the images (for example, icons) indicative of the products Y2 and Y3 along with the movement of the image indicative of the product Y1 in accordance with an operation by the user. Accordingly, the products Y2 and Y3 having the same function as the product Y1 are also indicated to be installed into the device C by the installation of the product Y1, to the user.

In a case where plural installed products mutually having the dependency of the exact match case γ are installed in the same image forming device 10, if a user executes an update operation on a portion of the installed products having the dependency of the exact match case γ, the display controller 80 controls display to indicate that the plural installed products are going to be updated, in a manner noticeable by the user. For example, the display controller 80 causes an image group (for example, icon group) indicative of the plural installed products to be displayed in a discriminated manner in the product display screen 84.

In a case where plural installed products mutually having the dependency of the exact match case γ are installed in the same image forming device 10, if a user executes an uninstallation operation of a portion of the installed products having the dependency of the exact match case γ, the display controller 80 controls display to indicate that the plural installed products are going to be uninstalled, in a manner noticeable by the user. For example, the display controller 80 causes an image group (for example, icon group) indicative of the plural installed products to be displayed in a discriminated manner in the product display screen 84.

In a case where plural installed products mutually having the dependency of the common component use case β are installed in the same image forming device 10, if a user executes an uninstallation operation of a portion of the installed products having the dependency of the common component use case β, the operation controller 82 does not delete a common module from the image forming device 10. Accordingly, even if a portion of installed products having the dependency of the common component use case β is uninstalled, the influence on another installed product is prevented.

As described above, in the second exemplary embodiment, control (display control or product operation control) is executed in accordance with the dependency of modules between plural products (for example, between an installed product and an available product, between plural installed products, between plural available products). Accordingly, a problem which is expected to occur between plural products having the dependency is prevented.

Also, by executing the product operation control, occurrence of a problem expected to occur between plural products having a dependency is prevented in advance. For example, in a case where the dependency between plural products is analyzed in a period from acceptance of an operation from a user to start of processing corresponding to the operation, and processing is executed or stopped in accordance with the analysis result, the user is required to wait until the operation is executed and the analysis is ended (until a response to the operation is made). According to the second exemplary embodiment, since an operation by a user is set as being invalid in advance in accordance with the dependency between plural products, the wait time is no longer required.

The above-described image forming device 10, information management servers 12, 12A, and 12B, and software management devices 14, 14A, and 14B each are realized by, for example, cooperation between hardware and software. To be specific, the above-described image forming device 10, information management servers 12, 12A, and 12B, and software management devices 14, 14A, and 14B each include one or plural processors, such as a central processing unit (CPU) (not shown). When the one or plural processors read out a program stored in a storage device (not shown) and executes the program, the functions of the respective units of the image forming device 10, information management servers 12, 12A, and 12B, and software management devices 14, 14A, and 14B are realized. The program is stored in the storage device through a storage medium, such as a compact disc (CD) or a digital versatile disc (DVD), or through a communication path such as a network. For another example, each of the respective units of the image forming device 10, information management servers 12, 12A, and 12B, and software management devices 14, 14A, and 14B may be realized by a hardware resource, such as a processor or an electronic circuit. For the realization, a device such as a memory may be used. For another example, each of the respective units of the image forming device 10, information management servers 12, 12A, and 12B, and software management devices 14, 14A, and 14B may be realized by, for example, a digital signal processor (DSP), or a field programmable gate array (FPGA).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a memory;
   a network interface; and
   a processor operatively connected to the network interface and memory; the processor being programmed to:
   acquire, either from the memory or from a server via the network interface, correlation information indicative of a correlation between each of a plurality of software packages and at least one of a plurality of software modules composing each of the software packages;
   acquire, either from the memory or from a device via the network interface, installation information indicative of a plurality of software modules installed in the device;

determine a first software package and a second software package installed in the device by comparing the plurality of software modules indicated in the acquired installation information to the acquired correlation information, the first software package including all of the software modules of the second software package and at least one software module that is not in the second software package;

cause a display to display the first software package; and in order to ensure that the user does not inadvertently inhibit operation of the first software package by deleting or updating the software modules the software modules of the second software package, either (i) prevent the display from displaying the second software package, or (ii) cause the display to display the second software package in a state in which an operation by a user attempting to change or remove the second software package is invalid.

2. The information processing device according to claim 1, wherein the processor is programmed to:
cause the display to display the first software package and the second software package on the basis of a dependency of software modules between the plurality of products.

3. The information processing device according to claim 2, wherein the processor is programmed to:
cause the display to display the first software package and the second software package as belonging to a same product group.

4. The information processing device according to claim 1, wherein the processor is programmed to:
control a software package installed in the device in accordance with a dependency between a plurality of software modules indicated by the acquired installation information.

5. The information processing device according to claim 4, the processor is programmed to:
in a case where a software module in the acquired installation information corresponds to a software module shared by a plurality of software packages, determines the first software package and the second software package without referring to the common software module.

6. The information processing device according to claim 1, wherein the processor is programmed to:
acquire information indicative of a type of the device, from the device; and
acquire the installation information on the basis of the acquired information indicative of the type of the device.

7. The information processing device according to claim 1, wherein the processor is programmed to:
cause the display to display a software package available for a user of the device in a specified product.

8. A non-transitory computer readable medium storing a program causing a computer to perform functions comprising:
acquiring, either from a memory or from a server via a network interface, correlation information indicative of a correlation between each of a plurality of software packages and at least one of a plurality of software modules composing each of the software packages;
acquiring either from the memory or from a device via the network interface, installation information indicative of a plurality of software modules installed in the device;
determining a first software package and a second software package installed in the device by comparing the plurality of software modules indicated in the acquired installation information to the acquired correlation information, the first software package including all of the software modules of the second software package and at least one software module that is not in the second software package;
causing a display to display the first software package; and
in order to ensure that the user does not inadvertently inhibit operation of the first software package by deleting or updating the software modules the software modules of the second software package, either (i) preventing the display from displaying the second software package, or (ii) causing the display to display the second software package in a state in which an operation by a user attempting to change or remove the second software package is invalid.

* * * * *